P. H. THOMPSON.
SHEARS FOR GLASS BLANKS.
APPLICATION FILED FEB. 16, 1915.
1,275,629.
Patented Aug. 13, 1918.
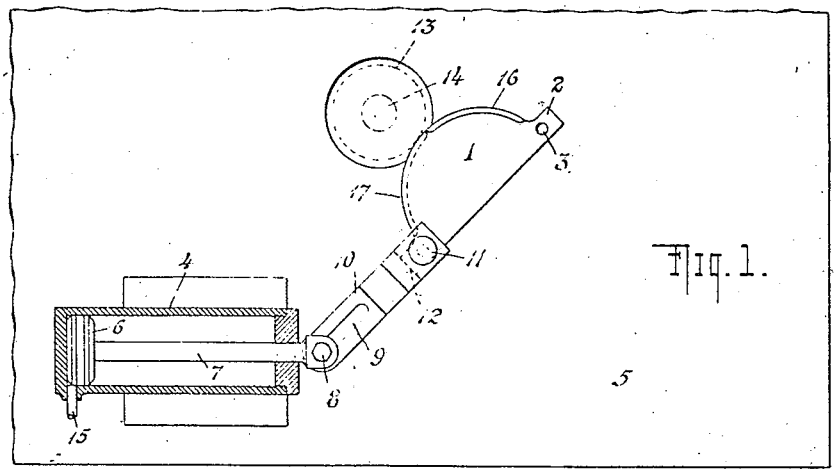
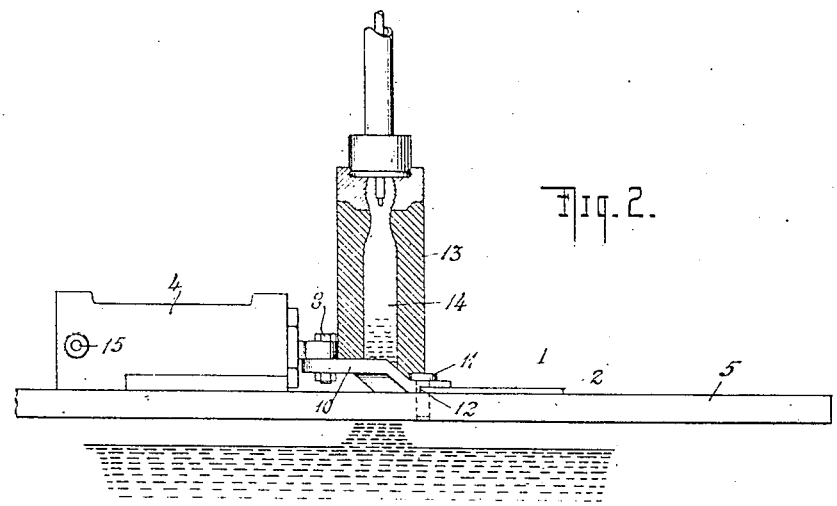
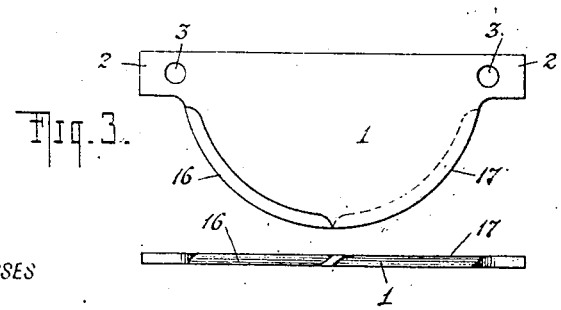
WITNESSES
INVENTOR
PARKE H. THOMPSON
BY
ATTORNEYS

UNITED STATES PATENT OFFICE.

PARKE H. THOMPSON, OF MILLVILLE, NEW JERSEY, ASSIGNOR TO MILLVILLE MACHINE COMPANY, OF MILLVILLE, NEW JERSEY, A CORPORATION OF NEW JERSEY.

SHEARS FOR GLASS BLANKS.

1,275,629.

Specification of Letters Patent.  Patented Aug. 13, 1918.

Application filed February 16, 1915.  Serial No. 8,448.

*To all whom it may concern:*

Be it known that I, PARKE H. THOMPSON, a citizen of the United States, residing at Millville, Cumberland county, New Jersey, have invented certain new and useful Improvements in Shears for Glass Blanks, of which the following is a specification.

My invention relates to a shear or cutting-off knife to be employed in connection with the manufacture of glass articles, such as bottles and the like. More particularly, my shear is intended for use in connection with that class of bottle making machines in which a quantity of glass is placed in a suitable parison mold, usually by suction, the excess glass then being cut off and the blank thereby formed being placed in a finishing mold for expansion into its final shape.

The object of my invention is to provide an improved shear which shall sever the excess glass by a motion which shall be both in the line of the cutting edge and at right angles thereto, thus cutting the glass smoothly instead of jaggedly as is the case when the cutting movement is entirely at right angles to the cutting edge.

A further object of my invention is to provide a knife or shear having two cutting edges and so disposed that either one of said edges may be instanly put into use without stopping the machine.

My invention will be better understood by referring to the accompanying drawings which show the same as employed for cutting off parison blanks such as would be produced, for example, by suction from a pool of glass up and into a suitable parison mold.

In the drawings, Figure 1 represents a plan view of a preferred embodiment of my shear in its relation to a parison blank for a glass bottle, as it would appear in a machine of the type just specified, other parts of the machine being omitted as unessential; Fig. 2 represents an elevation of Fig. 1; and Fig. 3 represents both a plan and an edge view of the knife proper.

Referring to the drawings, the shear or knife proper 1 is of sheet steel or other suitable material, preferably semi-circular in shape, and has diametrally opposite lugs 2 provided with holes 3 which serve as shear holding means. One-half of the semi-circular contour, that is to say, approximately 90°, is beveled on the upper side so as to provide a sharp lower edge, while the other half, or 90°, is beveled on the lower side so as to provide a similar upper edge. The shear is operated by an air cylinder 4 fixed to the table 5 and provided with piston 6 which operates a piston rod 7. The outer end of the piston rod carries a pivot pin 8 which engages the slot 9 of a connecting link 10, the outer end of which is bent so as to be flush with table 5 and is pivotally attached thereto by a pin 11. This outer end of link 10 is recessed on its under side at 12 so as to provide a square shoulder against which may be abutted the square end 2 of shear. The pivot pin 11, which has an easy fit in the end of link 10, also drops through hole 3 of the shear. Link 10 and shear 1 are thus rigidly united and are pivotally attached to the table as a unit.

In Figs. 1 and 2 the parison mold 13, and the glass 14 with which it is filled, appear as they would after the mold has been lowered into the molten glass, suction applied to fill the mold, and the latter again raised above the table; the glass of the blank is still connected with the glass of the pool and is to be cut off with the shear.

Air is now applied to pipe 15 and piston 6 moved to the right. This causes the shear to be rotated about the fixed pivot 11 so as to sweep the outer edge 16 of the shear across the lower part of the blank and cut off the same flush with the table 5. The motion with which the shear thus cuts off the blank is one which may clearly be resolved into two components, one tangential to the cutting edge and the other perpendicular thereto. The cut will, therefore, be clean and smooth.

When the one edge 16 has become dulled so that it no longer makes a sharp clean cut, pin 11 may be plucked out, the shear turned over end for end, and pin 11 replaced. This places edge 17 in cutting position instead of edge 16 as before.

As the outer end of link 10 and the shear 1 are normally flush with and move upon the top of table 5 it is clear that rigid and perfect operative connection is established between them by use of the pin 11 (which also serves as a pivot and is held in place merely by gravity) in view of the shouldered recess 12 and the correspondingly squared end of lug 2.

By reason of the shear being always in contact with the table as it moves to and fro in the performance of its cutting function, the edge of the shear continues to be continuously resharpened automatically.

Having described my invention:

I claim:

1. Apparatus for cutting off parison blanks comprising, in combination with a table, a flat edged shear having one end in contact with the table, a link having one end in contact with the table but recessed upon its lower side to receive the shear end, and a pin through both link and shear end uniting them together the end of said pin being detachably inserted in the table top.

2. Apparatus for cutting off parison blanks comprising, in combination with a table, a semi-circular shear of sheet metal having half of its curved contour provided with an edge on the upper surface and the other half with an edge on the lower surface and having its diametrally opposite portions shaped as square ended lugs, a link having one end in contact with the table and its lower surface recessed to receive an end of the shear, registering holes in the engaged ends of link and shear, and a pin adapted to drop easily through said holes and into a bearing in the table top.

3. A semi-circular shear for glass provided with diametrally opposite attaching lugs half of the curved contour having a cutting edge on the lower surface of the shear and the other half having a cutting edge on the upper surface of the shear.

4. A shear member for use in glass cutting apparatus, said member having a curved contour at its cutting edge, one portion of the cutting edge being on the lower surface of said member and another portion of such cutting edge being on the upper surface of the member, together with means for holding the said member in either one of two reversed positions, substantially as described.

5. A shear member for use in glass cutting apparatus, said member having a convex contour at its cutting edge, one portion of the cutting edge being on the lower surface of said member and another portion of such cutting edge being on the upper surface of the member, together with means for holding the said member in either one of two reversed positions, substantially as described.

In testimony whereof I have hereunto set my hand in the presence of two subscribing witnesses.

PARKE H. THOMPSON.

Witnesses:
THOMAS WHITAKER,
MARY M. TULLER.